(12) United States Patent  
Wigsten et al.

(10) Patent No.: US 6,689,003 B2  
(45) Date of Patent: Feb. 10, 2004

(54) LIMITED ARTICULATION CHAIN (INVERTED TOOTH OR ROLLER) CREATED BY "SQUARING" ENDS (TOP AND/OR BOTTOM) OF LINKS/GUIDES OF CHAIN

(75) Inventors: Mark MacDonald Wigsten, Lansing, NY (US); Brian R. Scotti, Freeville, NY (US); George L. Markley, Montour Falls, NY (US)

(73) Assignee: BorgWarner Inc., Auburn Hills, MI (US)

( * ) Notice: Subject to any disclaimer, the term of this patent is extended or adjusted under 35 U.S.C. 154(b) by 1 day.

(21) Appl. No.: 09/861,269

(22) Filed: May 18, 2001

(65) Prior Publication Data

US 2002/0173394 A1 Nov. 21, 2002

(51) Int. Cl.$^7$ ............................. F16H 55/30; F16H 7/06
(52) U.S. Cl. ........................................ 474/212; 74/213
(58) Field of Search ................................ 474/212, 213, 474/214, 215, 216, 217, 218, 228, 229, 230, 231; 59/78.1

(56) References Cited

U.S. PATENT DOCUMENTS

| 499,961 | A | | 6/1893 | Brown | |
|---|---|---|---|---|---|
| 1,140,319 | A | * | 5/1915 | van Houten | 474/139 |
| 1,266,572 | A | * | 5/1918 | Fisher | 474/228 |
| 1,734,688 | A | | 11/1929 | Morse | |
| 1,780,040 | A | | 10/1930 | Pierce | |
| 1,995,112 | A | | 3/1935 | Belcher | 74/245 |
| 2,281,938 | A | * | 5/1942 | Klaucke | 198/803.13 |
| 3,283,789 | A | * | 11/1966 | Silvon | 30/384 |
| 3,604,755 | A | * | 9/1971 | Krekeler | 299/84.1 |
| 3,841,169 | A | * | 10/1974 | Bisewski | 474/231 |
| 4,449,960 | A | * | 5/1984 | van der Lely | 474/242 |
| 5,156,574 | A | | 10/1992 | Gai | 474/155 |
| 5,393,272 | A | | 2/1995 | Okuwaki et al. | 474/213 |
| 5,409,424 | A | | 4/1995 | Okuwaki et al. | 474/212 |
| 6,500,084 | B2 | * | 12/2002 | Wigsten | 474/212 |

* cited by examiner

*Primary Examiner*—David A. Bucci
*Assistant Examiner*—Bradley J. Van Pelt
(74) *Attorney, Agent, or Firm*—Brown & Michaels, PC; Greg Dziegielewski

(57) ABSTRACT

A limited articulation chain design that prevents or reduces chain jumping at a given amount of chain slack comprises a chain having a plurality of alternating inner and outer links having ends interconnected by pins, wherein the ends of the outer links are partially or substantially squared on the sprocket side, such that the ends of adjacent outer links limit articulation of the links around the pins to a predetermined radius, by interfering with the adjacent outer links at the predetermined radius.

6 Claims, 3 Drawing Sheets

LIMITED ARTICULATION CHAIN (INVERTED TOOTH OR ROLLER) CREATED BY "SQUARING" ENDS (TOP AND/OR BOTTOM) OF LINKS/GUIDES OF CHAIN

BACKGROUND OF THE INVENTION

1. Field of the Invention

The invention pertains to the field of mechanical power transmission chains. More particularly, the invention pertains to a limited articulation chain and method for preventing or reducing chain jumping.

2. Description of Related Art

The present invention generally relates to mechanical power transmission chains. A conventional chain drive system includes an endless chain, comprising a sequence of links interconnected by pins, operatively engaged with at least two sprocket wheels supported by shafts. The chain is typically designed such that each consecutive link fits over a "sprocket," or what is more commonly referred to as a "tooth" of a sprocket wheel. The distance between the links in the chain is known as the "pitch." Typically, mechanical energy from an engine or other power source is applied to the shaft of a driving sprocket wheel, and conveyed by means of the endless chain to a driven sprocket wheel for driving a mechanism. The relative speed of the sprocket wheels varies according to their relative circumferences and, thus, the number of sprockets or teeth on each wheel.

Such mechanical chain drive systems commonly are used in bicycles, motorcycles, conveyor belts, automobiles and various other industrial applications. In a typical engine timing drive application, the driving sprocket is mounted on the engine crankshaft and the driven sprocket is mounted on the camshaft.

There are several types of chain used for the transmission of power. The present invention is applicable to all types of chains, and has particular application to "silent" chains, inverted-tooth chains and roller chains, which are well known in the art and widely used in automotive engine timing applications, as well as other automotive applications, such as, for example, in the transfer of power from a torque converter to a transmission or in a transfer case of a four-wheel drive vehicle.

One common type of chain used for the transmission of power is the roller chain. Conventional roller chains typically comprise a sequence of alternate inner links and outer links, wherein the links are interconnected by pins. The inner links, which are also known as bushing links, typically consist of spaced apart inner plates with bushings tightly received in apertures at each end of the inner plates. The outer links, which are also known as pin links or guide links, typically consist of spaced apart outer plates with pins tightly received in apertures at each end of the outer plates. The bushings freely rotate about the pins to pivotally connect the outer links to the inner links in alternate arrangement. Rollers typically are provided on the bushings, and the roller chain is wrapped about a sprocket. The teeth of the sprocket are received between the laterally spaced plates and the longitudinally spaced rollers.

The term "roller chain" includes both true roller and rollerless designs. The true roller design includes the above-described rollers mounted about the bushings. Rollerless chain or bushing chain contains bushings that directly contact the sprocket. Both types of roller chain are typically specified in industry as British Standard chain and American National Standards Institute (ANSI) chain.

An inverted-tooth chain is similar to a roller chain, but has links made of toothed metal plates. A number of these links are placed side by side to form a group, and each group is joined to the next by meshing the ends of the links of both groups and inserting a pin. The width of an inverted-tooth chain varies with the number of links in each group. A "silent chain" is a type of inverted-tooth chain that has been modified to decrease the noise generated during use of the chain.

In many chain drive applications, the links of the chain extend with use and the chain increases in length, particularly during the period of initial use when components of the chain are worn in, or after a long period of service, when components of the chain have worn out. Due to the increased length of the chain, or for other reasons, such as maladjustment, a chain may become slack with respect to its sprockets. One problem with slack in a chain is that it can cause the chain to "jump" or "skip" one or more teeth on a sprocket. Particularly in certain applications, such as engine timing, tooth jumping is a significant problem because it negatively affects mechanical performance by altering engine timing, for example.

Thus, there is a need in the art for a chain design that prevents or reduces chain jumping at a given amount of available chain slack. A chain design that prevents or reduces chain jumping is useful for at least two reasons: 1) such a chain design eliminates the need for the ratchet mechanisms that often are added to chain tensioners, in attempts to limit chain slack and reduce tooth jumping; and 2) such a chain design allows small pitch chains, which often are useful in reducing mechanical noise, to be used in applications that otherwise would typically require larger pitch chains.

SUMMARY OF THE INVENTION

Briefly stated, a limited articulation chain design that prevents or reduces chain jumping at a given amount of chain slack comprises a chain having a plurality of alternating inner and outer links having ends interconnected by pins, wherein the ends of the outer links are partially or substantially squared on the sprocket side, such that the ends of adjacent outer links limit articulation of the links around the pins to a predetermined radius, by interfering with the adjacent outer links at the predetermined radius.

According to one embodiment, a limited articulation chain design that prevents or reduces chain jumping at a given amount of chain slack comprises a chain having a plurality of alternating inner and outer links, each link comprising a pair of opposed link plates, each link plate having at least two connection apertures located substantially towards the ends thereof, and each link being connected to an adjacent link by a pin passing through overlapping connection apertures in adjacent link plates, wherein the ends of the outer link plates are partially or substantially squared on the sprocket side, such that the ends of adjacent outer link plates limit articulation of the links around the pins to a predetermined radius, by interfering with the adjacent outer link plates at the predetermined radius.

According to another embodiment, a method for preventing or reducing chain jumping at a given amount of chain slack comprises the step of providing a chain drive system with a chain having a plurality of alternating inner and outer links having ends interconnected by pins, wherein the ends of the outer links are partially or substantially squared on the sprocket side, such that the ends of adjacent outer links limit articulation of the links around the pins to a predetermined radius, by interfering with the adjacent outer links at the predetermined radius, such that the chain has a radius of curvature slightly smaller than that of the smallest sprocket in the system.

For a better understanding of these and other aspects of the invention, reference should be made to the following detailed description taken in conjunction with the accompanying figures.

DETAILED DESCRIPTION OF THE INVENTION

The invention is a chain design that prevents or reduces the chain from jumping on its sprockets. The invention comprises a modification to the links or guides of a conventional chain, such that the rotation or articulation of the links or guides around the chain pins is limited. The invention is applicable to virtually all types of chains. One embodiment of the invention comprises a roller chain wherein the ends of the chain links are partially or substantially squared on the sprocket side. Another embodiment comprises an inverted-tooth chain wherein the ends of the outside guides are partially or substantially squared on the sprocket side.

Figure 1:
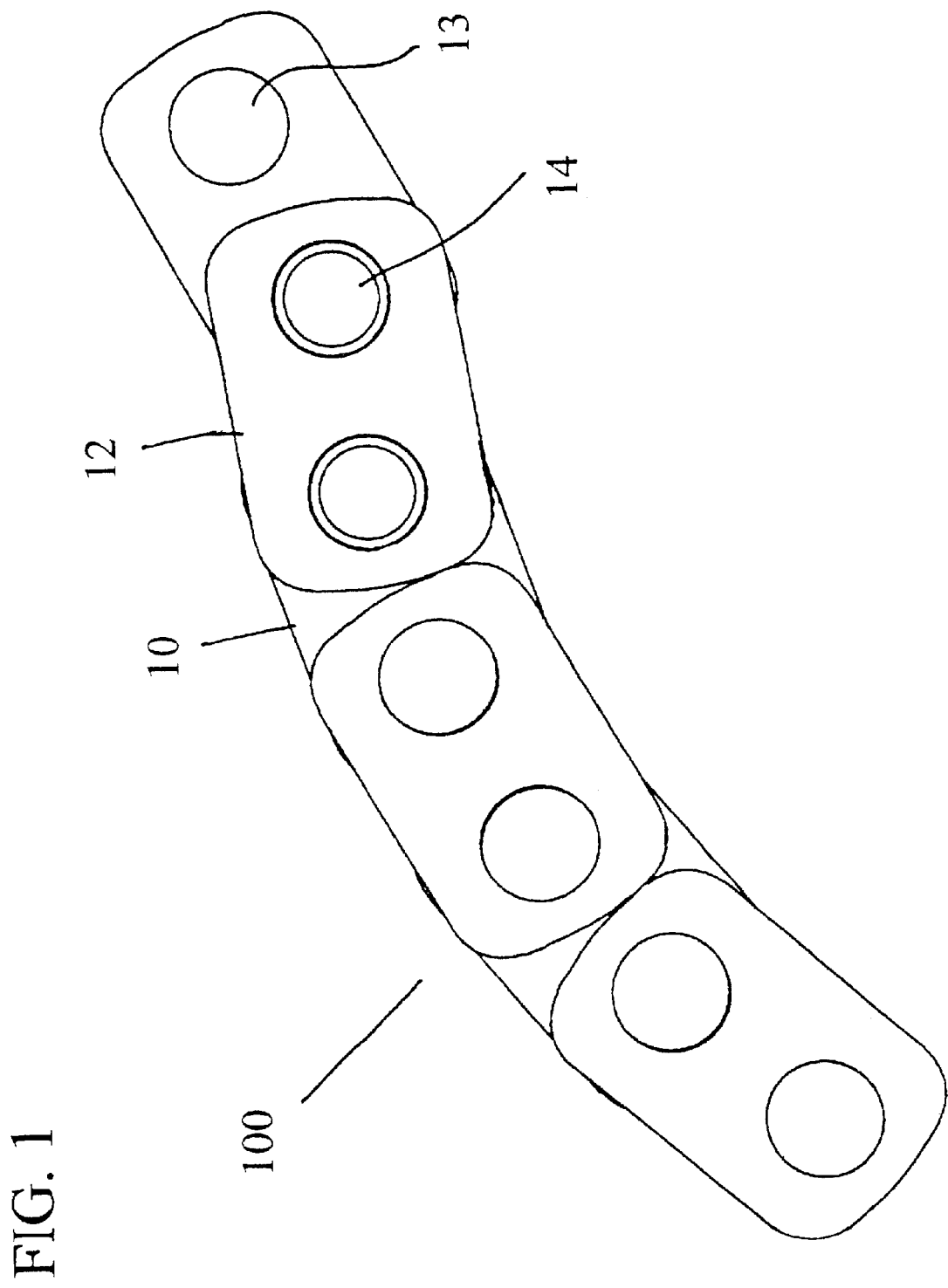
FIG. 1 shows an embodiment of the limited articulation chain of the present invention.
Figure 2:
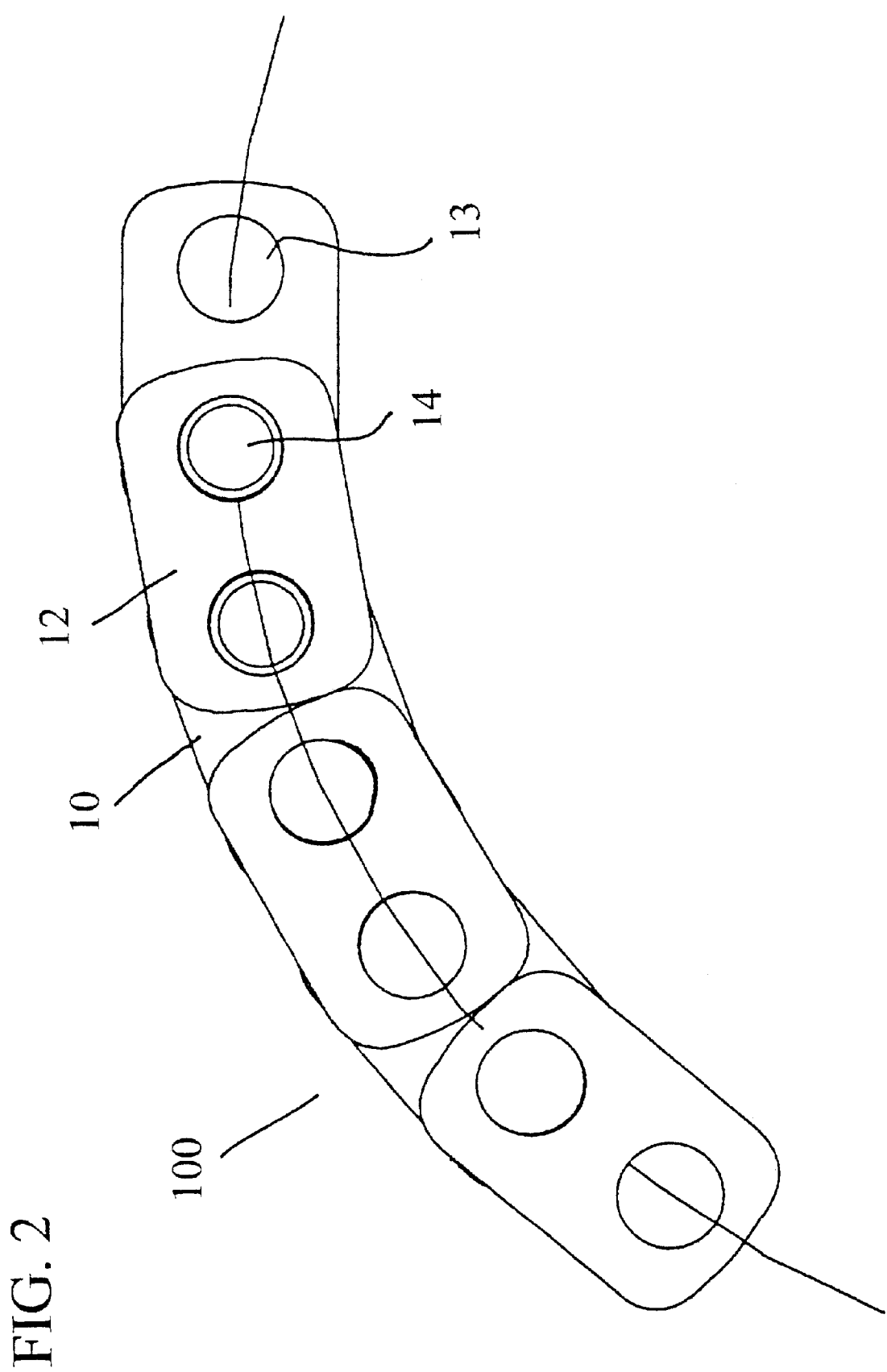
FIG. 2 shows an embodiment of the limited articulation chain of the present invention, illustrating how the invention limits the minimum effective radius of the chain.
Figure 3:
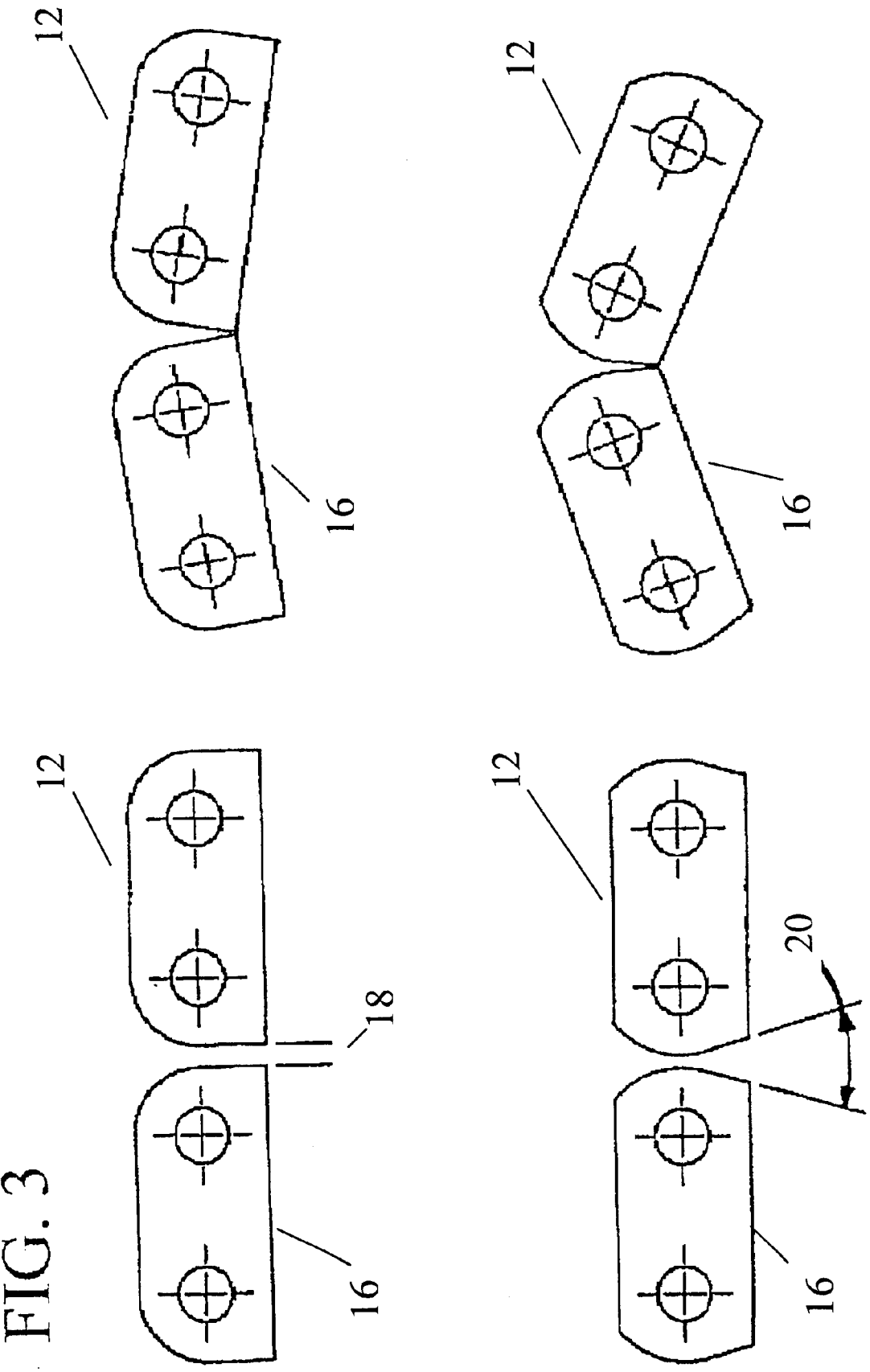
FIG. 3 shows two embodiments of the limited articulation chain of the present invention, illustrating how the gap between the ends of adjacent links or a limiting angle between links limits the minimum effective radius of the chain.

The improved chain of the present invention is shown in FIGS. 1–3 and is indicated generally by reference numeral 100. The chain 100 includes a plurality of alternating inner links and outer links, similar to those described with reference to the prior art, each inner link preferably comprising a pair of opposed inner link plates 10, and each outer link preferably comprising a pair of opposed outer link plates 12. Each link plate preferably comprises at least two connection apertures 13 located substantially towards the ends thereof, and each link is connected to an adjacent link by a pin 14 passing through overlapping connection apertures 13 in adjacent link plates. The ends of said outer link plates 12 are partially or substantially squared on the sprocket side 16, such that said squared ends of adjacent outer link plates 12 limit articulation of said links around said pins 14 to a predetermined radius 21, by interfering with said adjacent outer link plates 12 at said predetermined radius.

The amount of available chain slack under worst case conditions, such as, for example, a fully worn chain with a fully compressed tensioner, must be compared to the amount of slack required to raise the chain off the sprocket and index it to the next sprocket tooth gap. Limiting the rotation or articulation of the links, according to the present invention, increases the slack required to allow the chain to jump over a tooth. Rotation is limited by link-to-link contact at the corners of the rectangular link plates. The amount of allowable link-to-link articulation is determined by reference to the smallest sprocket in the system. The chain of the present invention is designed to bend just enough to fit the smallest sprocket 22, but articulation is limited, such that the chain cannot bend below a particular radius, preferably just below that of the smallest sprocket. Such limited link-to-link articulation prevents one link of the chain from rising over a tooth at a time. Instead, several links would have to be lifted over their corresponding teeth simultaneously, which requires substantially more chain slack than "walking" one link at a time over the sprocket teeth. Hence, chain jumping can be prevented or reduced at a given amount of chain slack.

One embodiment of the invention described herein comprises partially or substantially rectangular chain links, such that both the sprocket side and non-sprocket side of the chain links comprise partially or substantially squared corners. This embodiment may well be the preferred embodiment for certain applications, particularly in regard to ease of manufacturing and/or assembly. However, the primary problem solved by the invention, i.e., prevention of tooth-jumping, only requires limiting chain link articulation on the sprocket side of the chain. Thus, an alternative embodiment comprises chain links wherein only the corners on the sprocket side of the chain are partially or substantially squared. Referring to FIG. 3, chain links of the present invention, wherein the ends of the links on the sprocket side 16 of the chain are flat and at right angles to the sides of the links, limit articulation such that the gap 18 between the ends of adjacent links 12 determine the amount of articulation. Another embodiment comprises link ends having a radius and two flats having a limiting angle 20 larger than 90 degrees to the sides, wherein the ends of the links 12 on the sprocket side 16 of the chain determine the amount of articulation, as shown in FIG. 3. It is further contemplated that the chain links of the invention limit articulation while located in the middle of a chain operating on a grooved sprocket.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A limited articulation chain for use with a sprocket having a radius of curvature comprising:
    a plurality of alternating inner and outer links, having ends interconnected by pins, the outer links being substantially rectangular in form, wherein said ends of said outer links are comprised of first and second ends that are partially or substantially squared on a sprocket side, such that link to link contact occurs between the first and second ends on the sprocket side of the outer links when the articulation of said links around said pins is at a predetermined radius at which the chain is limited by said link to link contact on the sprocket side of the outer links to an amount of slack less than that required to raise the chain off the sprocket and index it to a next sprocket tooth gap and said chain will not jump teeth of said sprocket.

2. The limited articulation chain of claim 1, wherein said chain is selected from the group consisting of:
    a) a roller chain;
    b) a rollerless chain;
    c) an inverted tooth chain; and
    d) a silent chain.

3. The limited articulation chain of claim 1, wherein said ends of said outer links are partially or substantially squared on a side opposite said sprocket side.

4. In a chain drive system comprising an endless chain having a plurality of alternating inner and outer links having ends interconnected by pins, the outer links being substantially rectangular in form, and at least two sprockets, wherein at least one of said sprockets is smallest in radius of the at least two sprockets, a method for preventing or reducing chain jumping, comprising the step of:

forming said ends of said outer links in a partially or substantially squared form on a sprocket side, such that link to link contact occurs between said squared ends of adjacent outer links when the articulation of said links around said pins is at a predetermined radius at which the chain is limited by said link to link contact to an amount of slack less than that required to raise the chain off the sprocket which is smallest in radius and index it to a next sprocket tooth gap and said chain will not jump teeth of said sprocket.

5. The method of claim 4, wherein said chain is selected from the group consisting of:

a) a roller chain;
b) a rollerless chain;
c) an inverted tooth chain; and
d) a silent chain.

6. The method of claim 4, in which said forming step comprises forming said ends of said outer links in a partially or substantially squared form on a side opposite said sprocket side.

* * * * *